Oct. 31, 1939.   D. L. LAMB   2,177,776

GREASE RESERVOIR

Filed Feb. 5, 1937

INVENTOR.
Daniel L. Lamb
BY Sam J. Slotsky
ATTORNEY

Patented Oct. 31, 1939

2,177,776

UNITED STATES PATENT OFFICE 2,177,776

GREASE RESERVOIR

Daniel L. Lamb, Wakefield, Nebr.

Application February 5, 1937, Serial No. 124,238

1 Claim. (Cl. 74—605)

My invention relates to a grease reservoir for certain types of rotating bearing connections, and is particularly adaptable to a connection on a power sickle.

An object of my invention is to provide a grease reservoir which will efficiently grease the moving or rotating joints.

A further object of my invention is to provide a grease reservoir of this character which will tightly retain the grease so that the same will not become unduly wasted thereby involving increased friction and wearing of the parts.

A further object of my invention is to provide such a reservoir which is self-contained so that the grease circulates through the system without loss.

A further object of my invention is to provide the above mentioned objects in a simple construction which can be manufactured at a reasonable cost.

Figure 1:
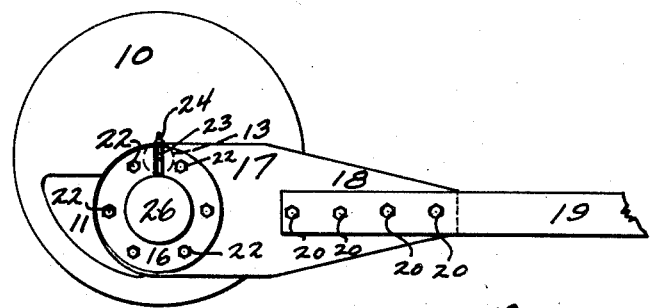
Figure 2:
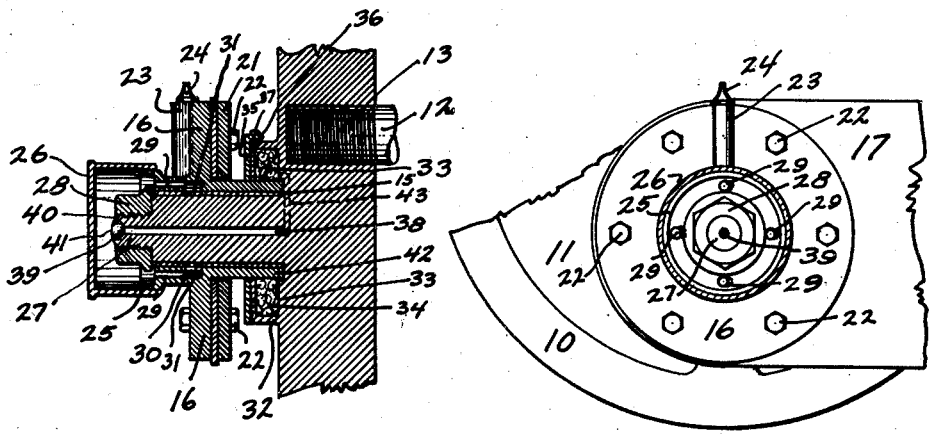
Figure 3:
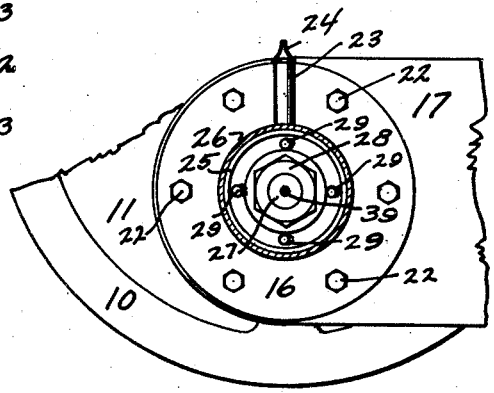

With these and other objects in view, my invention consists in the construction, arrangement and combination of the various parts of my device, whereby the objects contemplated are attained, as hereinafter more fully set forth, pointed out in my claim, and illustrated in the accompanying drawing, in which:

Figure 1 is a side elevation of the reservoir attached to a standard sickle driving arrangement, Figure 2 is an enlarged detail taken along the central axis of the reservoir, and Figure 3 is a side elevation of Figure 2, with the part 26 being shown in section.

The driving member on the usual power sickle does not include efficient arrangements for maintaining a greased and efficiently packed connection. To offset this disadvantage I have devised the present invention which, of course, will apply to similar joints of analogous construction.

I have used the character 10 to designate the counter-balanced driving connection which is cut out at 11, the balance of the wheel being left solid to provide a suitable counter-weighted construction.

The wheel member 10 is driven by means of the shaft 12, which is threadably attached thereto at 13. Eccentrically mounted on the member 10 is the further shaft 14, which is an integral extension thereof.

Rotating about the shaft 14 is the bronze bushing 15, which is securely attached within the further member 16. Attached adjacent to member 16 is the arm 17, which extends into the portion 18, to which is attached the bar 19 by means of suitable bolts 20. The bar 19 in its reciprocal motion drives the sickle, which need not be described here.

A further washer member 21 is attached to the ring shaped member 16 by means of the bolts and nuts 22. A boss 23 is provided which carries the pressure grease connection 24. The member 16 extends into the threaded member 25, upon which is threadedly engaged the cylindrical grease cap 26, as shown.

The shaft 14 terminates in the threaded extension 27, upon which is securely screwed the nut 28. The length of shaft 14 is made slightly longer than the length of the bushing so that there will be sufficient clearance to provide a rotatable connection between the members.

Passing parallel to the central axis of the shaft 14 are the four openings 29, which communicate from the grease cap 26 to the ring shaped channel 30, which in turn communicates through the bushing at 31 through suitable openings to the shaft 14.

Integrally formed together with the driving member 10, is the cylindrical hollow member 32. Received within the hollow member 32 and completely filling the same is the felt gasket or washer 33. A further metal washer such as 34 can be driven into the cylindrical member 32 and enclosing the same is the further disc shaped member 35, which includes three ears such as 36, and set approximately 120° apart, and attached to the ears 36 are the machine screws 37, which screw into the walls of member 32 thereby securely retaining the member 35.

An opening 38 is provided directly on the longitudinal axis of shaft 14, which also communicates with a further passage 43 to the felt gasket. The other end of the opening 38 is closed by means of a small ball valve 39, which is secured by means of small extensions 40 in the shaft 14. The ball valve 39 is so placed against suitable beveled portions in the opening 38 that surplus grease will only be transmitted outwardly in the direction of the arrow 41.

It will now be observed from the foregoing description that after the grease is placed in the joint by means of the pressure connection or in the grease cap that it passes downwardy through the openings 29 into the ring portion 31, where it is evenly distributed over the bearing. As the grease works inwardly toward the member 10 and as it passes exteriorly about the hub portion 42, it will be securely retained from leaking by means of the felt member 33, which is additionally protected by means of the washer 34 and the member 35.

The joint between these members is practically a running fit to provide further protection against leakage. Any surplus grease which has a tendency to remain adjacent to the felt member will tend to be forced thereinstead backwardly through the opening 43, and thence through opening 38, and thence through the ball valve 39, back into the grease cup 26, since the ball valve will allow movement only in one direction.

The openings 29 are also angled slightly for the same purpose so that the grease will be carried from the grease cup efficiently to the bearing. As a result it will be noted that I have provided a completely circulatory type of grease reservoir and have provided especially means for retaining the grease upon such a type of joint.

It will also be seen that I have provided an efficient arrangement of this type which is simple in construction and reasonable in cost of manufacture.

Some changes may be made in the construction and arrangement of the parts of my invention without departing from the real spirit and purpose of my invention, and it is my intention to cover by my claim any modified forms of structure or use of mechanical equivalents, which may be reasonably included within their scope.

I claim as my invention:

In combination with an eccentric driving shaft, a hub member including a bearing receiving said shaft, a grease cup attached to said hub member, means for causing transference of grease to the shaft through said bearing, means for preventing leakage of grease at the inner hub end of the shaft including a cylindrical retainer, a felt gasket packed in the retainer and closely surrounding the hub end, means for holding said felt gasket securely including a disc member having extended ears, means coacting with the ears to lock the disc member to said cylindrical retainer and against said felt gasket, means for allowing passage of grease from the felt washer to the grease cup including a passageway communicating therewith, valved means at the grease cup end of said passageway.

DANIEL L. LAMB.